United States Patent
Hanlon et al.

(10) Patent No.: US 9,122,309 B2
(45) Date of Patent: Sep. 1, 2015

(54) ACTIVE HUMAN-MACHINE INTERFACE WITH FORCE SENSOR OVERLOAD PROTECTION

(71) Applicant: HONEYWELL INTERNATIONAL INC., Morristown, NJ (US)

(72) Inventors: Casey Hanlon, Queen Creek, AZ (US); Donald Jeffrey Christensen, Phoenix, AZ (US); Steve Spicer, Tempe, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 444 days.

(21) Appl. No.: 13/675,260

(22) Filed: Nov. 13, 2012

(65) Prior Publication Data

US 2014/0135949 A1    May 15, 2014

(51) Int. Cl.
G06F 3/01    (2006.01)
G01L 5/22    (2006.01)
G05G 9/047   (2006.01)

(52) U.S. Cl.
CPC ............... G06F 3/016 (2013.01); G01L 5/223 (2013.01); G05G 9/047 (2013.01); G05G 2009/04762 (2013.01); G05G 2009/04766 (2013.01)

(58) Field of Classification Search
CPC ............. G01L 5/223; G06F 3/016; G05G 2009/04762; G05G 9/047; G05G 2009/04766
See application file for complete search history.

(56) References Cited

U.S. PATENT DOCUMENTS

| | | | |
|---|---|---|---|
| 4,439,648 A | 3/1984 | Reiner et al. | |
| 4,479,038 A | 10/1984 | Marhold et al. | |
| 4,758,692 A | 7/1988 | Roeser et al. | |
| 4,947,701 A * | 8/1990 | Hegg | 74/471 XY |
| 5,228,348 A | 7/1993 | Frigiere | |
| 5,286,024 A * | 2/1994 | Winblad | 273/148 B |
| 5,805,140 A * | 9/1998 | Rosenberg et al. | 345/161 |
| 5,872,320 A | 2/1999 | Kamentser et al. | |
| 6,067,077 A * | 5/2000 | Martin et al. | 345/161 |
| 6,104,382 A * | 8/2000 | Martin et al. | 345/161 |
| 6,259,433 B1 * | 7/2001 | Meyers | 345/161 |
| 6,429,849 B1 * | 8/2002 | An et al. | 345/161 |
| 6,997,765 B1 * | 2/2006 | McGuinness | 440/14 |
| 7,109,971 B2 | 9/2006 | Furukawa | |
| 7,193,607 B2 * | 3/2007 | Moore et al. | 345/156 |
| 7,884,565 B2 | 2/2011 | Kern et al. | |
| 8,094,121 B2 | 1/2012 | Obermeyer et al. | |
| 2002/0174736 A1 * | 11/2002 | Chapman | 74/471 XY |
| 2006/0019555 A1 * | 1/2006 | McGuinness | 440/21 |
| 2008/0156939 A1 * | 7/2008 | Hanlon et al. | 244/223 |
| 2009/0178502 A1 * | 7/2009 | Kern et al. | 74/471 XY |
| 2009/0178503 A1 * | 7/2009 | Hanlon et al. | 74/471 XY |
| 2009/0183596 A1 * | 7/2009 | Tanner et al. | 74/815 |
| 2011/0270478 A1 | 11/2011 | Parker | |

* cited by examiner

Primary Examiner — Ramesh Patel
(74) Attorney, Agent, or Firm — Ingrassia Fisher & Lorenz, P.C.

(57) ABSTRACT

A human-machine interface includes a user interface, a gimbal assembly, a gimbal interface rod, a force sensor mount, and a spacer. The gimbal assembly is coupled to the user interface. The gimbal interface rod is coupled to and extends from the gimbal assembly. The force sensor mount is coupled to the user interface and to the gimbal assembly, is configured to have a plurality of force sensors coupled thereto, and surrounds a portion of the gimbal interface rod and is spaced apart therefrom to define a circumferential gap. The spacer is disposed between and engages the portion of the gimbal interface rod and the force sensor mount, and is configured to maintain the circumferential gap between the force sensor mount and the gimbal interface rod until a predetermined user input force is supplied to the user interface whereupon the force sensor mount engages the gimbal interface rod.

20 Claims, 4 Drawing Sheets

ACTIVE HUMAN-MACHINE INTERFACE WITH FORCE SENSOR OVERLOAD PROTECTION

TECHNICAL FIELD

The present invention generally relates to human-machine interfaces, and more particularly relates to an active human-machine interface with force sensor overload protection.

BACKGROUND

Human-machine interfaces are used in myriad industries to translate human movements to machine movements. For example, some aircraft flight control systems include a human-machine interface in the form of a control stick, sometimes referred to as a side stick. The flight control system, in response to input forces supplied to the human-machine interface from the pilot, controls the movements of various aircraft flight control surfaces. No matter the particular end-use system, the human-machine interface preferably includes some type of haptic feedback mechanism back through the interface to the interface operator.

Many haptic feedback mechanisms are implemented using one or more force sensors as the primary input device to the feedback loop. In some instances, the force sensors are coupled to a part that deflects when a user supplies an input force to the human-machine interface. The forces sensors, upon deflection of the part, supply force signals representative of the input force to a control, which in turn controls current supplied to a motor. The motor, which is coupled to the human-machine interface, for example via a gearbox, supplies a feedback force to the user interface. Although these types of haptic feedback mechanisms are generally safe and reliable, they do suffer certain drawbacks. For example, because it is postulated that the user interface could be inadvertently overloaded, the part to which the force sensors are coupled is typically manufactured relatively robustly, which can increase overall cost.

Hence, there is a need for human-machine interface that provides relatively low cost overload protection of the force sensors. The present invention addresses at least this need.

BRIEF SUMMARY

In one embodiment, a human-machine interface includes a user interface, a gimbal assembly, a gimbal interface rod, a force sensor mount, and a spacer. The user interface is adapted to be grasped by a hand of a user and is configured to receive a user input force. The gimbal assembly is coupled to the user interface and is configured, in response to the user input force supplied to the user interface, to allow the user interface to move from a null position to a control position. The gimbal interface rod is coupled to and extends from the gimbal assembly. The force sensor mount is coupled to the user interface and to the gimbal assembly and is configured to have a plurality of force sensors coupled thereto. The force sensor mount surrounds a portion of the gimbal interface rod and is spaced apart therefrom to define a circumferential gap between the force sensor mount and the portion of the gimbal interface rod. The spacer is disposed between and engages the portion of the gimbal interface rod and the force sensor mount. The spacer is configured to maintain the circumferential gap between the force sensor mount and the gimbal interface rod until a predetermined user input force is supplied to the user interface whereupon the force sensor mount engages the portion of the gimbal interface rod.

In another embodiment, a human-machine interface includes a user interface, a gimbal assembly, a gimbal interface rod, a force sensor mount, a plurality of fore sensors, and a plurality of flexible O-rings. The user interface is adapted to be grasped by a hand of a user and is configured to receive a user input force. The gimbal assembly is coupled to the user interface and is configured, in response to the user input force supplied to the user interface, to allow the user interface to move from a null position to a control position. The gimbal interface rod is coupled to and extends from the gimbal assembly. The force sensor mount is coupled to the user interface and to the gimbal assembly and is configured to have a plurality of force sensors coupled thereto. The force sensor mount surrounds a portion of the gimbal interface rod and is spaced apart therefrom to define a circumferential gap between the force sensor mount and the portion of the gimbal interface rod. The force sensors are coupled to the force sensor mount. Each force sensor is configured to sense at least a portion of the user input force supplied to the user interface and supply a force signal representative thereof. The flexible O-rings are disposed between and engage the portion of the gimbal interface rod and the force sensor mount. The flexible O-rings are configured to maintain the circumferential gap between the force sensor mount and the gimbal interface rod until a predetermined user input force is supplied to the user interface whereupon the force sensor mount engages the portion of the gimbal interface rod.

In yet another embodiment, a human-machine interface includes a user interface, a gimbal assembly, a gimbal interface rod, a force sensor mount, a platform portion, and a plurality of flexible spacers. The user interface is adapted to be grasped by a hand of a user and is configured to receive a user input force. The gimbal assembly is coupled to the user interface and is configured, in response to the user input force supplied to the user interface, to allow the user interface to move from a null position to a control position. The gimbal interface rod is coupled to and extends from the gimbal assembly. The force sensor mount is coupled to the user interface and to the gimbal assembly and is configured to have a plurality of force sensors coupled thereto. The force sensor mount surrounds a portion of the gimbal interface rod and is spaced apart therefrom to define a circumferential gap between the force sensor mount and the portion of the gimbal interface rod. The platform portion extends radially from the gimbal interface rod and is coupled to the force sensor mount. The flexible spacers are disposed between and engage the portion of the gimbal interface rod and the force sensor mount. Each spacer is configured to maintain the circumferential gap between the force sensor mount and the gimbal interface rod until a predetermined user input force is supplied to the user interface whereupon the force sensor mount engages the portion of the gimbal interface rod.

Furthermore, other desirable features and characteristics of the human-machine interface system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1B:
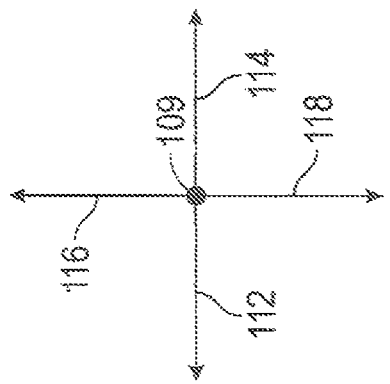
FIG. 1B depicts the rotational axes about which the human-machine interface system of FIG. 1A can rotate.
Figure 1A:
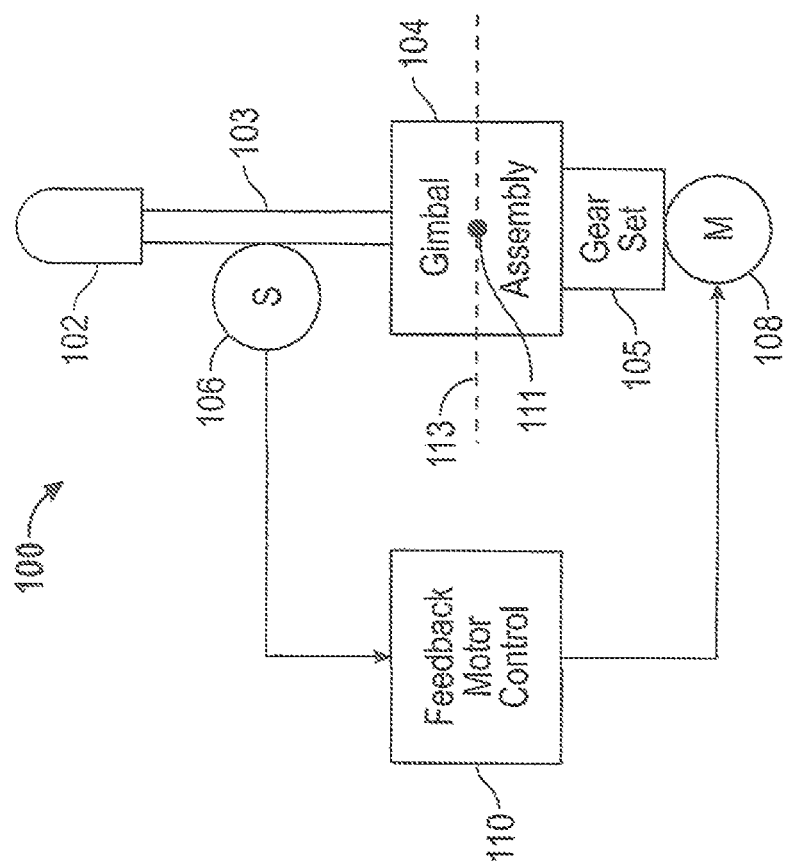
FIG. 1A depicts a functional block diagram of an embodiment of a human-machine interface system.

Turning first to FIG. 1A, an exemplary embodiment of an active human-machine interface system 100 is depicted. The system 100 includes a user interface 102, a gimbal assembly, one or more force sensors 106, a feedback motor 108, and a feedback motor control 110. The user interface 102 may be implemented according to any one of numerous configurations. In the depicted embodiment, however, it is implemented as a grip that is preferably dimensioned to be grasped by a hand.

The gimbal assembly 104 is coupled to the user interface 102 via a gimbal interface rod 103 that is coupled to, and extends from, the gimbal assembly 104. The gimbal assembly 104 is configured to allow the user interface 102 to be moved from a null position 109, which is the position depicted in FIG. 1A, to a plurality of control positions in a plurality of directions. More specifically, the gimbal assembly 104, in response to an input force supplied to the user interface 102, allows the user interface to be moved from the null position 109 to a plurality of control positions, about two perpendicular rotational axes—a first rotational axis 111 and a second rotational axis 113. It will be appreciated that if the active human-machine interface system 100 is implemented as an aircraft flight control human-machine interface, such as a pilot (or co-pilot) inceptor, then the first and second rotational axes 111, 113 may be referred to as the roll axis and the pitch axis, respectively.

No matter its specific end use, the gimbal assembly 104 allows the user interface 102 to be movable about the first rotational axis 111 in a port direction 112 and a starboard direction 114, and about the second axis 113 in a forward direction 116 and an aft direction 118. It will additionally be appreciated that the gimbal assembly 104 is configured to allow the user interface 102 to be simultaneously rotated about the first and second rotational axes 111, 113 to move the user interface 102 in a combined forward-port direction, a combined forward-starboard direction, a combined aft-port direction, or a combined aft-starboard direction, and back to or through the null position 109.

Each of the force sensors 106 (for clarity, only one depicted) is coupled to the user interface 102 and the gimbal assembly 104, and is configured to sense at least a portion of the user input force that is supplied to the user interface 102. Each of the force sensors 106 is further configured to supply a force signal representative of the portion of the user input force. The force signals are supplied to the feedback motor control 110 and may, in some embodiments, be supplied to a non-illustrated external device or system. The feedback motor control 110 is configured, in response to the force signals, to appropriately control current to the feedback motor 108. The force sensor(s) 106 may be implemented using any one of numerous types of suitable force sensing devices, and may be coupled to the user interface 102 and gimbal assembly 104 using any one of numerous techniques. A particular preferred technique will be described in more detail further below.

The feedback motor 108 may be implemented using any one of numerous types of motors, now known or developed in the future, but is preferably implemented as a brushless motor. No matter the particular type of feedback motor 108 that is used, however, it may be coupled to the user interface 102 and/or gimbal assembly 104 via, for example, suitable a gear set 105. The motor current supplied to the feedback motor 108 is controlled by the feedback motor control 110. In particular, the feedback motor control 110 is coupled to receive the force signals from the force sensor(s) 104 and is configured, in response thereto, to control motor current to the haptic feedback motor.

Figure 2:
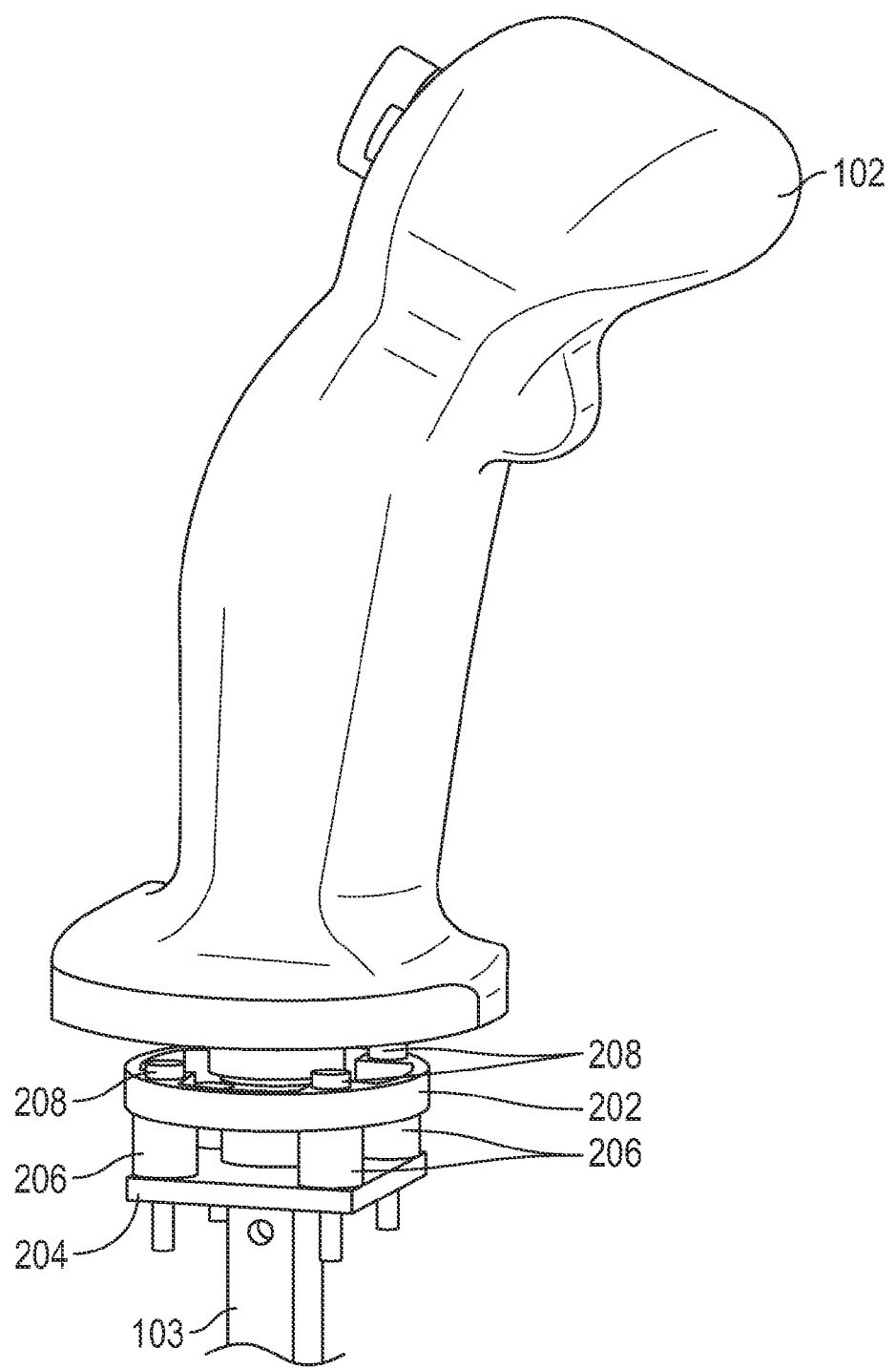
FIG. 2 depicts a plan view of a portion of one example embodiment of a physical implementation of the human-machine interface system of FIG. 1A.
Figure 3:
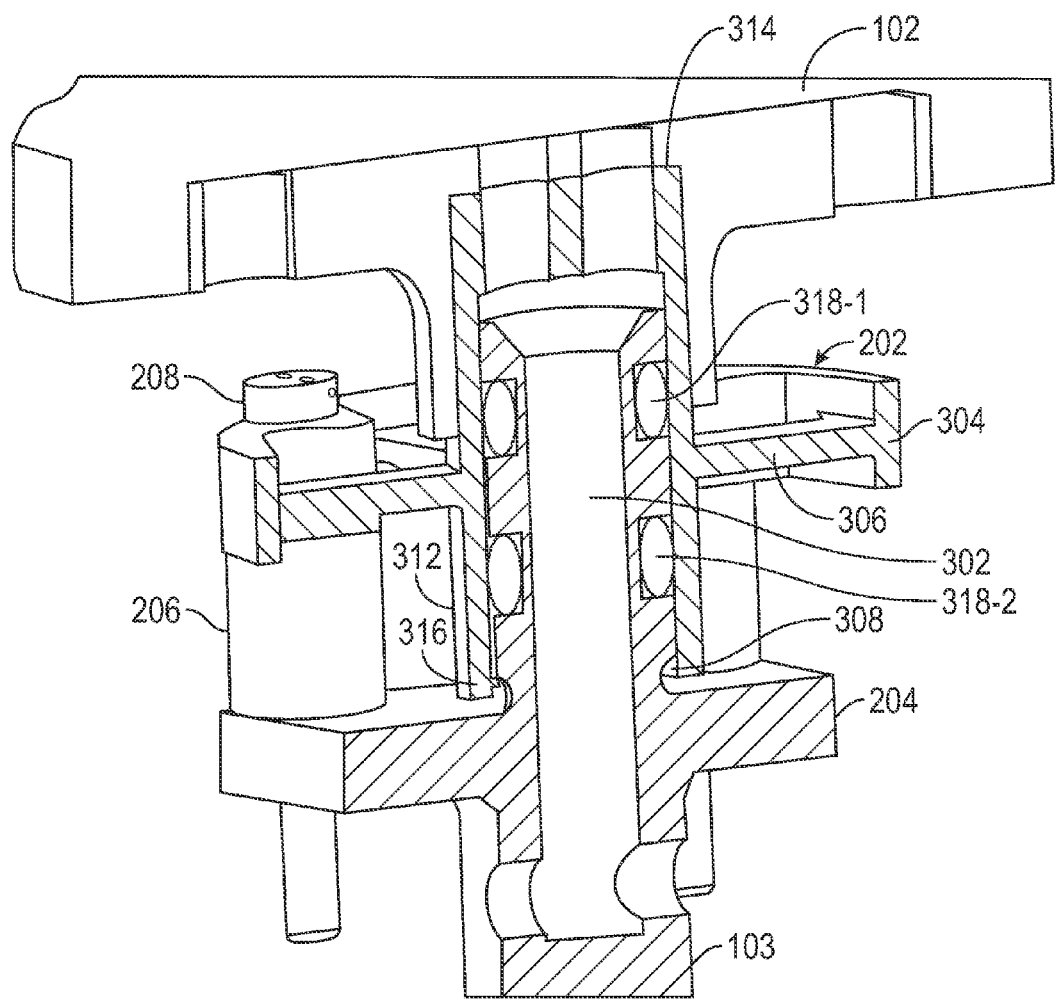
FIG. 3 depicts a cross section view of a portion of the embodiment depicted in FIG. 2.
Figure 4:
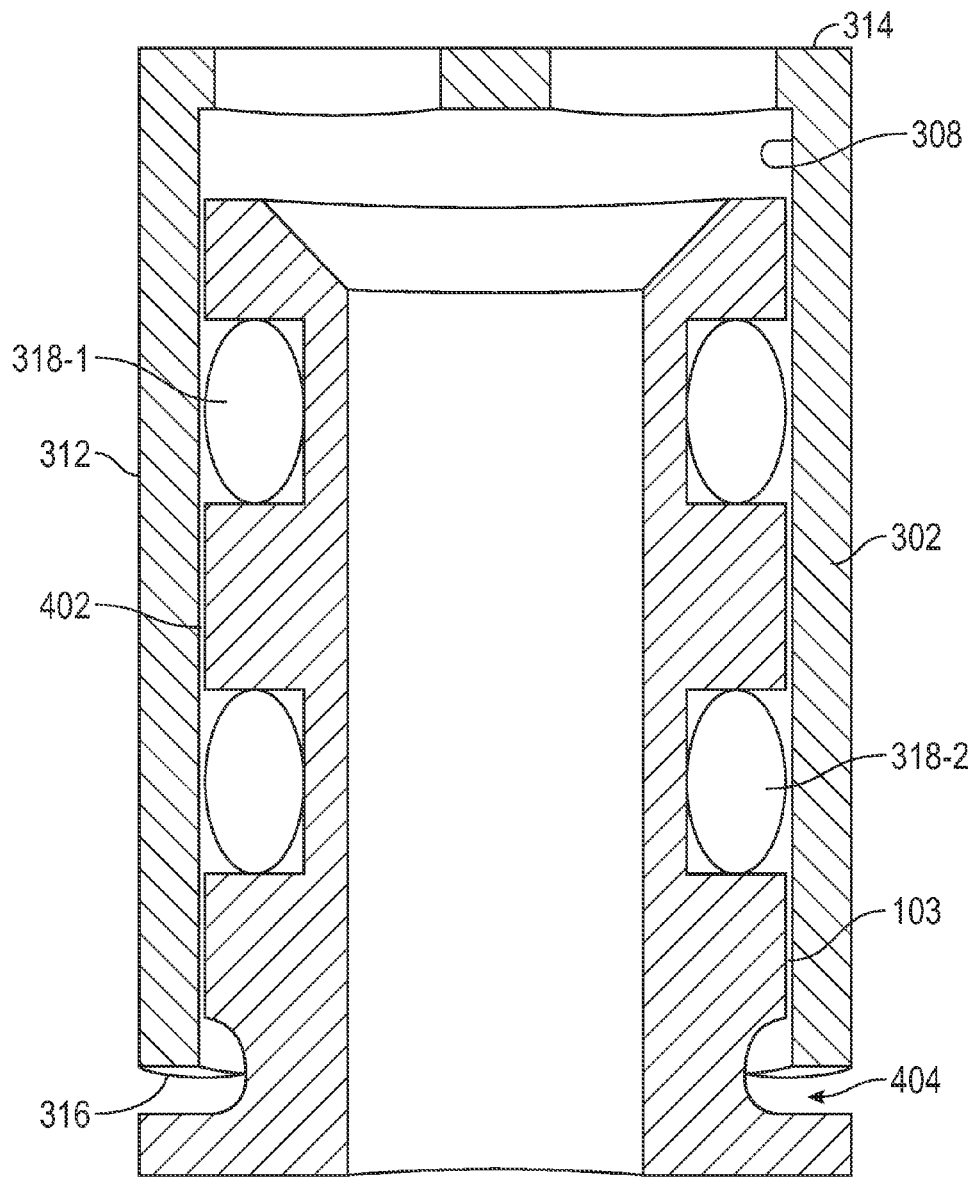
FIG. 4 depicts a close-up view of a portion of the cross section depicted in FIG. 3.

As was noted above, the one or more force sensors 104 may be coupled to the user interface 102 and the gimbal assembly 104 using numerous techniques. However, a particular preferred technique is depicted in FIGS. 2-4, which also depicts a particular physical implementation of a portion of the human-machine interface system 100 depicted in FIG. 1. With reference now to FIG. 2-4, the particular coupling technique will be described.

The one or more force sensors 104 (not illustrated in FIG. 2) are preferably coupled to a force sensor mount 202, which is in turn coupled to the user interface 102 and to the gimbal assembly 104. More specifically, the force sensor mount 202 is coupled to the user interface 102 and to a platform portion 204 that extends radially from the gimbal interface rod 103. In the depicted embodiment, the force sensor mount 202 is coupled to the platform portion 204 via stand-offs 206 and suitable fasteners 208. It will be appreciated that the stand-offs 206 may be separate components, or may be integrally formed as part of the force sensor mount 202 or as part of the platform portion 204.

With reference now to FIGS. 3 and 4, the depicted force sensor mount 202 includes an inner section 302, an outer section 304, and a plurality of intermediate sections 306 (only 2 depicted in FIG. 3). The inner section 302 includes an inner surface 308, an outer surface 312, a first end 314, and a second end 316. The inner section 302 surrounds a portion of the gimbal interface rod 103, and the inner surface 308 is spaced apart from this portion of the gimbal interface rod 103 to define a circumferential gap 402 (see FIG. 4). The first end 314 is coupled to the user interface 102, and the second end 31 is spaced apart from the platform portion 204 by a predetermined distance 404. The outer section 304 is spaced apart from the inner section 302 and is coupled to the platform portion 204. The intermediate sections 306 are coupled between the outer section 304 and the outer surface 312 of the inner section 302. Each of the intermediate sections 306 has a non-illustrated force sensor 104 mounted thereon, and each is configured to flex when an input force is supplied to the user interface 102.

With continued reference to FIGS. 3 and 4, at least one spacer 318 is disposed between and engages the gimbal interface rod 103 and the force sensor mount 202. In the depicted embodiment, two spacers 318 are used (e.g., 318-1, 318-2). It will be appreciated, however, that more or less than this number of spacers 318 may be used. It will additionally be appreciated that the spacer(s) 318 may be implemented using any one of numerous suitable devices. In the depicted embodiment, the spacer(s) 318 is (are) implemented using one or more O-rings, and more preferably flexible O-rings. It will be appreciated that his is merely one example of a suitable spacer, and that various others may be used. Some other suitable spacers include a spring arrangement, such as, for example, one or more split rings, or one or more radial rings similar to the springs used for compliant bearing mounting.

No matter the specific number, the one or more spacers 318 are configured to maintain the circumferential gap 402 between the force sensor mount 202 and the gimbal interface rod 103 until a predetermined user input force is supplied to the user interface 102. When the predetermined user input force is supplied, the force sensor mount 202, and more specifically the inner surface 308 of the force sensor mount 202, engages the portion of the gimbal interface rod 103 that the force sensor mount 202 surrounds. Additionally, the second end 314 of the force sensor mount 202 will engage the platform portion 204 when the predetermined user input force is supplied to the user interface 102. As a result, when the predetermined user input force is supplied, the intermediate sections 306 of the force sensor mount 202 will no longer flex, thereby preventing the force sensor(s) 106 from being overloaded. It will be appreciated that the predetermined gap 402 and predetermined distance 404 may be varied and may be selected to achieve desired performance and/or overload protection goals.

The human-machine interface system configuration described herein provides alternative load paths for further force inputs to the user interface, thereby preventing the force sensors from being overloaded while not limiting the force that can be applied to the user interface.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A human-machine interface, comprising:
   a user interface adapted to be grasped by a hand of a user and configured to receive a user input force;
   a gimbal assembly coupled to the user interface and configured, in response to the user input force supplied to the user interface, to allow the user interface to move from a null position to a control position;
   a gimbal interface rod coupled to and extending from the gimbal assembly;
   a force sensor mount coupled to the user interface and to the gimbal assembly and configured to have a plurality of force sensors coupled thereto, the force sensor mount surrounding a portion of the gimbal interface rod and spaced apart therefrom to define a circumferential gap between the force sensor mount and the portion of the gimbal interface rod; and
   a spacer disposed between and engaging the portion of the gimbal interface rod and the force sensor mount, the spacer configured to maintain the circumferential gap between the force sensor mount and the gimbal interface rod until a predetermined user input force is supplied to the user interface whereupon the force sensor mount engages the portion of the gimbal interface rod.

2. The human-machine interface of claim 1, wherein the spacer is selected from the group consisting of an O-ring, a split ring, and a radial ring.

3. The human-machine interface of claim 1, further comprising one or more additional spacers disposed between and engaging the portion of the gimbal interface rod and the force sensor mount.

4. The human-machine interface of claim 3, wherein each of the spacer and each of the additional spacer comprise an O-ring.

5. The human-machine interface of claim 1, further comprising:
   a platform portion extending radially from the gimbal interface rod and coupled to the force sensor mount.

6. The human-machine interface of claim 5, wherein:
   the force sensor mount includes an inner section, an outer section, and a plurality of intermediate sections;
   the inner section includes an inner surface and an outer surface, the inner surface surrounds and is spaced apart from the portion of the gimbal interface rod to define the circumferential gap;
   the outer section is spaced apart from the inner section and is coupled to the platform portion;
   the intermediate sections are coupled between the outer section and the outer surface of the inner section, each intermediate section having a force sensor mounted thereon.

7. The human-machine interface of claim 6, wherein:
   the inner section comprises a first end and a second end, the first end coupled to the user interface, the second end spaced apart from the platform portion by a predetermined distance; and
   the second end engages the platform portion when the predetermined user input force is supplied to the user interface.

8. The human-machine interface of claim 1, further comprising:
   a plurality of force sensors coupled to the force sensor mount, each force sensor configured to sense at least a portion of the user input force supplied to the user interface and supply a force signal representative thereof.

9. The human-machine interface of claim 8, further comprising:
a haptic feedback motor coupled to the gimbal assembly, the haptic feedback motor further coupled to receive motor current and operable, upon receipt of the motor current, to supply haptic feedback to the gimbal assembly.

10. The human-machine interface of claim 9, further comprising:
a feedback motor control coupled to receive the force signals and configured, in response thereto, to control motor current to the haptic feedback motor.

11. A human-machine interface, comprising:
a user interface adapted to be grasped by a hand of a user and configured to receive a user input force;
a gimbal assembly coupled to the user interface and configured, in response to the user input force supplied to the user interface, to allow the user interface to move from a null position to a control position;
a gimbal interface rod coupled to and extending from the gimbal assembly;
a force sensor mount coupled to the user interface and to the gimbal assembly and configured to have a plurality of force sensors coupled thereto, the force sensor mount surrounding a portion of the gimbal interface rod and spaced apart therefrom to define a circumferential gap between the force sensor mount and the portion of the gimbal interface rod;
a plurality of force sensors coupled to the force sensor mount, each force sensor configured to sense at least a portion of the user input force supplied to the user interface and supply a force signal representative thereof; and
a plurality of flexible O-rings disposed between and engaging the portion of the gimbal interface rod and the force sensor mount, the flexible O-rings configured to maintain the circumferential gap between the force sensor mount and the gimbal interface rod until a predetermined user input force is supplied to the user interface whereupon the force sensor mount engages the portion of the gimbal interface rod.

12. The human-machine interface of claim 11, further comprising:
a platform portion extending radially from the gimbal interface rod and coupled to the force sensor mount.

13. The human-machine interface of claim 12, wherein:
the force sensor mount includes an inner section, an outer section, and a plurality of intermediate sections;
the inner section includes an inner surface and an outer surface, the inner surface surrounds and is spaced apart from the portion of the gimbal interface rod to define the circumferential gap;
the outer section is spaced apart from the inner section and is coupled to the platform portion;
the intermediate sections are coupled between the outer section and the outer surface of the inner section, each intermediate section having a force sensor mounted thereon.

14. The human-machine interface of claim 13, wherein:
the inner section comprises a first end and a second end, the first end coupled to the user interface, the second end spaced apart from the platform portion by a predetermined distance; and
the second end engages the platform portion when the predetermined user input force is supplied to the user interface.

15. The human-machine interface of claim 11, further comprising:
a haptic feedback motor coupled to the gimbal assembly, the haptic feedback motor further coupled to receive motor current and operable, upon receipt of the motor current, to supply haptic feedback to the gimbal assembly.

16. The human-machine interface of claim 15, further comprising:
a feedback motor control coupled to receive the force signals and configured, in response thereto, to control motor current to the haptic feedback motor.

17. A human-machine interface, comprising:
a user interface adapted to be grasped by a hand of a user and configured to receive a user input force;
a gimbal assembly coupled to the user interface and configured, in response to the user input force supplied to the user interface, to allow the user interface to move from a null position to a control position;
a gimbal interface rod coupled to and extending from the gimbal assembly;
a force sensor mount coupled to the user interface and to the gimbal assembly and configured to have a plurality of force sensors coupled thereto, the force sensor mount surrounding a portion of the gimbal interface rod and spaced apart therefrom to define a circumferential gap between the force sensor mount and the portion of the gimbal interface rod;
a platform portion extending radially from the gimbal interface rod and coupled to the force sensor mount; and
a plurality of flexible spacers disposed between and engaging the portion of the gimbal interface rod and the force sensor mount, each spacer configured to maintain the circumferential gap between the force sensor mount and the gimbal interface rod until a predetermined user input force is supplied to the user interface whereupon the force sensor mount engages the portion of the gimbal interface rod.

18. The human-machine interface of claim 17, wherein:
the force sensor mount includes an inner section, an outer section, and a plurality of intermediate sections;
the inner section includes an inner surface and an outer surface, the inner surface surrounds and is spaced apart from the portion of the gimbal interface rod to define the circumferential gap;
the outer section is spaced apart from the inner section and is coupled to the platform portion;
the intermediate sections are coupled between the outer section and the outer surface of the inner section, each intermediate section having a force sensor mounted thereon.

19. The human-machine interface of claim 18, wherein:
the inner section comprises a first end and a second end, the first end coupled to the user interface, the second end spaced apart from the platform portion by a predetermined distance; and
the second end engages the platform portion when the predetermined user input force is supplied to the user interface.

20. The human-machine interface of claim 17, further comprising:
a haptic feedback motor coupled to the gimbal assembly, the haptic feedback motor further coupled to receive motor current and operable, upon receipt of the motor current, to supply haptic feedback to the gimbal assembly; and a feedback motor control coupled to receive the force signals and configured, in response thereto, to control motor current to the haptic feedback motor.

* * * * *